United States Patent
Nishimura et al.

[11] Patent Number: 6,085,718
[45] Date of Patent: Jul. 11, 2000

[54] CONTROL SYSTEM FOR A DIRECT INJECTION-SPARK IGNITION ENGINE

[75] Inventors: Hirofumi Nishimura; Youichi Kuji, both of Hiroshima, Japan

[73] Assignee: Mazda Motor Corporation, Hiroshima, Japan

[21] Appl. No.: 09/199,450

[22] Filed: Nov. 25, 1998

[30] Foreign Application Priority Data

Sep. 29, 1998 [JP] Japan ................................. 10-274624

[51] Int. Cl.$^7$ ................................................ F02B 17/00
[52] U.S. Cl. ........................ 123/295; 123/299; 123/491
[58] Field of Search .................................. 123/299, 295, 123/300, 305, 491, 486

[56] References Cited

U.S. PATENT DOCUMENTS

| | | | |
|---|---|---|---|
| 5,101,785 | 4/1992 | Ito | 123/357 |
| 5,713,328 | 2/1998 | Anderson et al. | 123/299 |
| 5,797,367 | 8/1998 | Iida et al. | 123/295 |

FOREIGN PATENT DOCUMENTS

| | | |
|---|---|---|
| 7-119507 | 5/1995 | Japan . |
| 7-217478 | 8/1995 | Japan . |
| WO93/07363 | 4/1993 | WIPO . |

*Primary Examiner*—Henry C. Yuen
*Assistant Examiner*—Arnold Castro, Jr.
*Attorney, Agent, or Firm*—Nixon Peabody LLP; Donald R. Studebaker

[57] ABSTRACT

An engine control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda > 1$ controls divides a given amount of fuel into two parts which are intermittently delivered through early and late split injection respectively in a intake stroke and controls a fuel injector such that a midpoint between points at which the early and late split injection are timed respectively to start is before a midpoint of a intake stroke while the engine is in a cold condition in an enriched fuel charge zone.

16 Claims, 11 Drawing Sheets

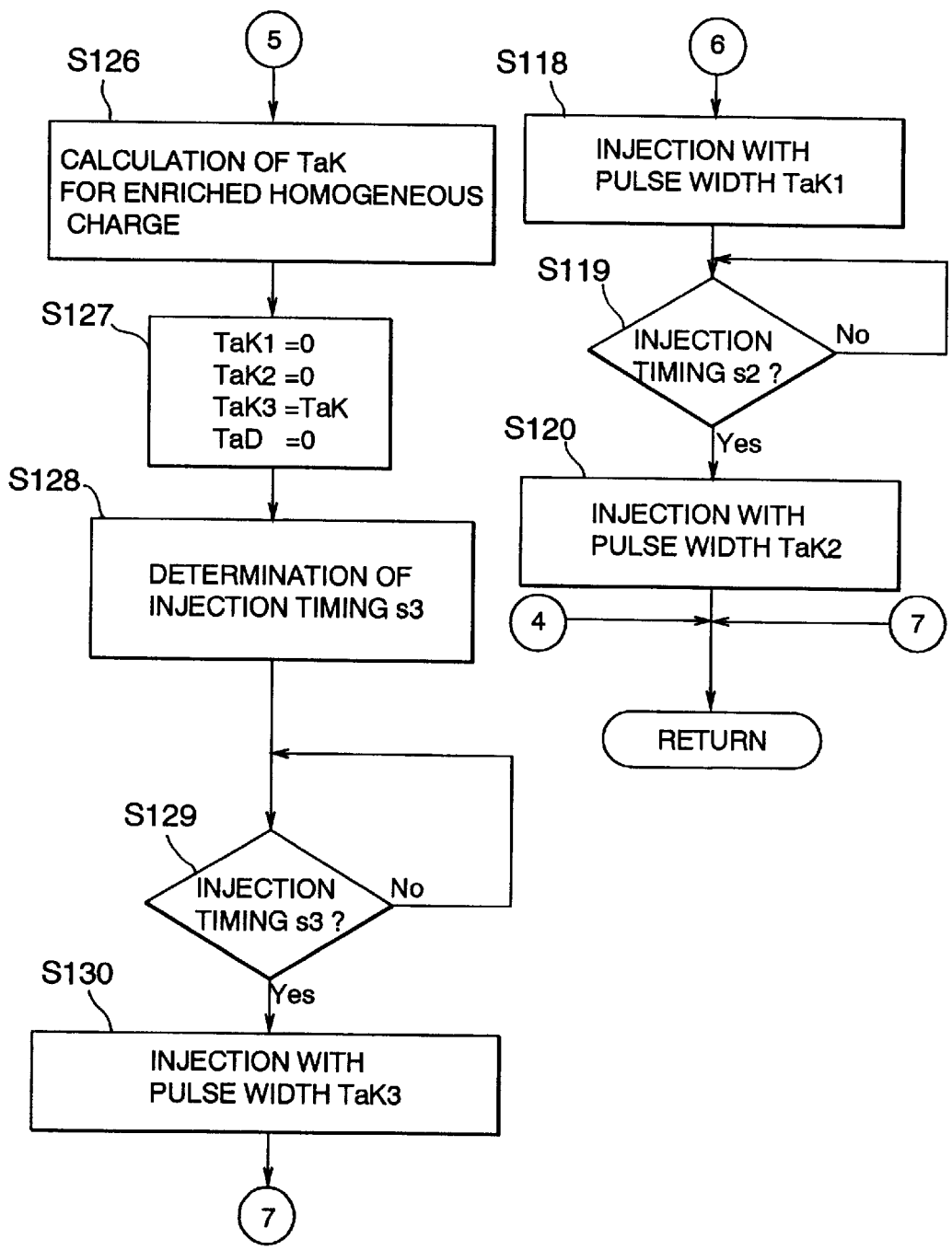

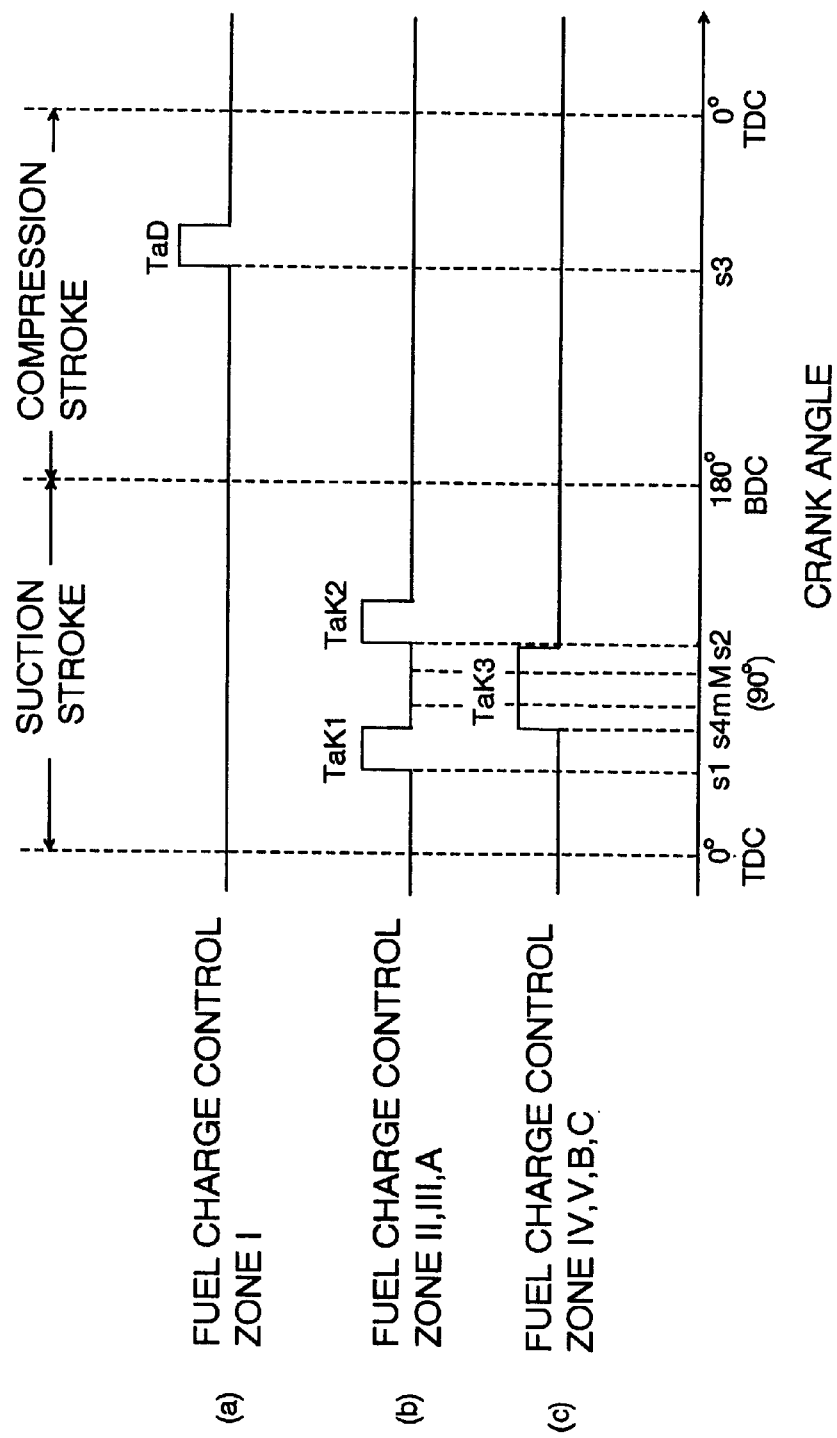

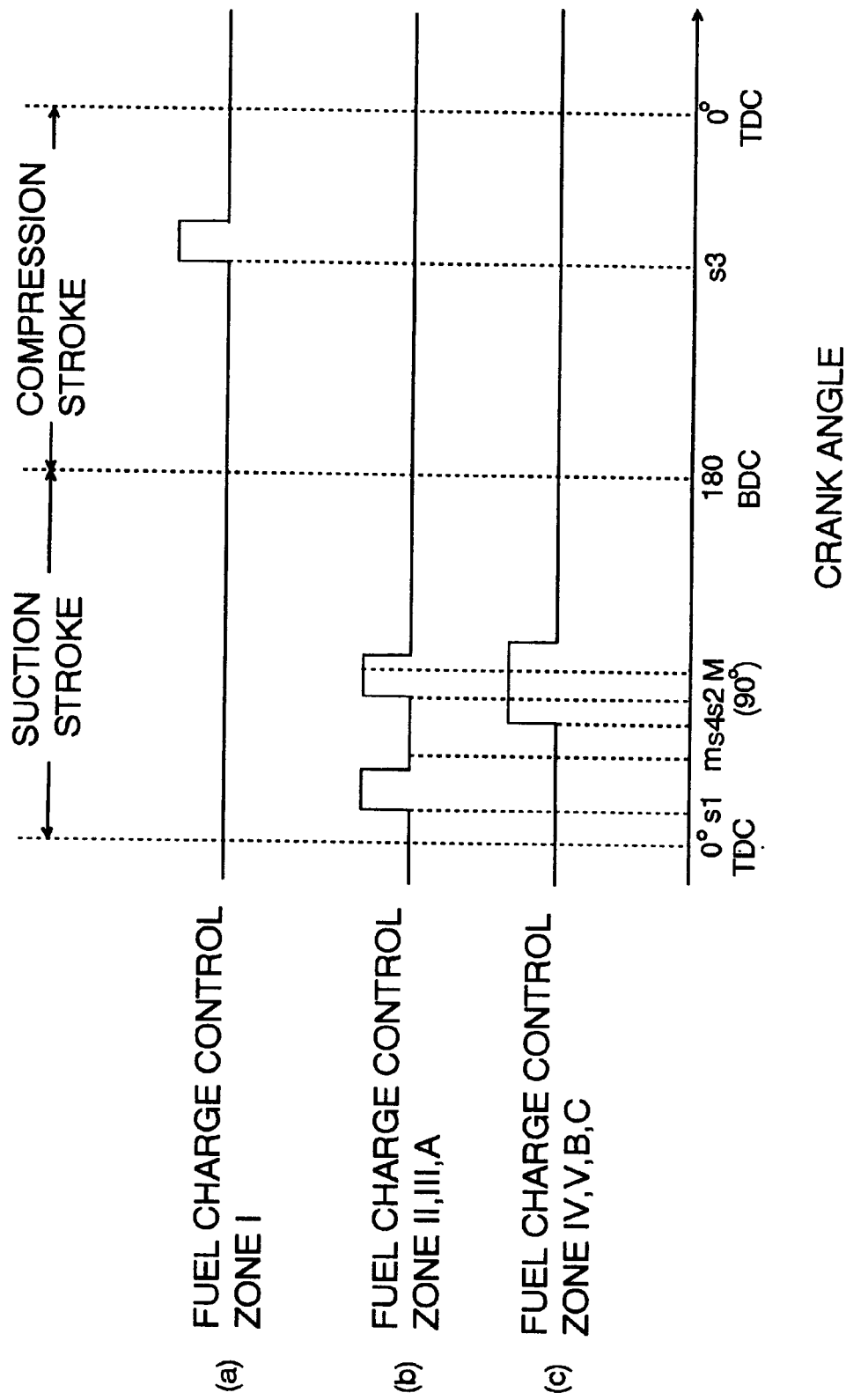

CONTROL SYSTEM FOR A DIRECT INJECTION-SPARK IGNITION ENGINE

BACKGROUND OF THE INVENTION

1. Field of the Invention

The invention relates to an engine control system for a direct injection-spark ignition type of engine, and, in particular, to a direct injection-spark ignition engine control system for controlling an fuel injection timing while the engine is in a cold condition.

2. Description of the Related Art

Engine control system of this type incorporate in an exhaust line a NOx adsorbing type of lean NOx conversion catalyst which, on one hand, adsorbs NOx in the exhaust gas while the air-fuel mixture is leaner than a stoichiometric mixture and, on the other hand, desorbs or releases the NOx into exhaust gas for catalyzing reduction of the NOx while the air-fuel mixture is richer than a stoichiometric mixture. As is known from, for example, International Patent Application W093/07363, such an engine control system controls the engine to operate with an enriched mixture under accelerating conditions or full loading operating conditions and with a lean mixture under the remaining operating conditions, so as to improve fuel consumption.

An engine control system for a direct injection-spark ignition type of engine known from, for example, Japanese Unexamined Patent Publication 7-119507 controls the engine to cause stratified charge combustion in a lower engine loading zone and homogeneous charge combustion in a high engine loading zone. While the engine operates with lower speeds in the high loading zone, a given amount of fuel is delivered in two steps through early and late split injection in a intake stroke, so as to diffuse a first half of fuel sprayed through the early split injection in the combustion chamber before the end of a intake stroke and the second half of fuel in the combustion chamber with its volume increased, This prevents a generation of rich or dense mixture over the top of a piston in a subsequent compression stroke that generally occurs when a given amount of fuel is sprayed all at once through non-split injection, which is desirable to prevent generation of smoke.

Another engine control system for a direct injection-spark ignition engine cooperates with a fuel injector which is direct to face the top of a piston and energized to spray a small amount of fuel preparatorily at the beginning of a intake stroke when the engine causes knocking. The fuel partly sticks to the top wall of the piston on a side of an intake port and bounces off the piston wall toward the intake port to cool the piston head and the combustion chamber on the intake port side with the heat of vaporization of the fuel. Such an engine control system is known from, for example, Japanese Unexamined Patent Publication 7-217478.

Generally, while an engine operates in a cold condition, fuel sprayed in the combustion chamber assumes aggravation of evaporation performance with an effect of a drop in ignitability and combustibility, which is always undesirable for combustion stability. Because a direct injection-spark ignition type of engine in particular provides only a period of time for fuel evaporation shorter than what is called a port injection type of engine, it causes remarkable aggravation of fuel evaporation performance.

It may be effective to avoid aggravation of fuel evaporation performance in a cold engine operation to increase the amount of fuel injection sufficiently to provide a large amount of evaporated fuel even during a cold engine, so as thereby to keep aggravation of ignitability and combustibility under control and, in consequence, to preserve desired combustion stability. However, combustion of an increased amount of fuel produces an increased amount of hydrocarbon (HC) and carbon monoxide (CO) due to over enrichment of a fuel mixture as well as lowering specific fuel consumption.

SUMMARY OF THE INVENTION

It is an objective of the invention to provide an engine control system for a direct injection-spark ignition type of engine which improves combustion stability in a cold engine condition by performing fuel injection in a specific pattern so as to provide a lean fuel mixture desirable for improving specific fuel consumption and lowering levels of harmful emissions.

The foregoing object of the present invention are achieved by providing an engine control system for a direct injection-spark ignition type of engine which energizes the fuel injector to intermittently deliver a given amount of fuel in two steps through early and late split injection respectively in a intake stroke and controls the fuel injector such that the midpoint between points at which the early and late split injection are timed respectively to start is before the midpoint of the intake stroke.

According to a preferred embodiment of the invention, the engine control system is operative to control a direct injection-spark ignition type of engine which is equipped with a fuel injector for delivering fuel directly into a combustion chamber. Specifically, while the engine is monitored to be in an operating condition in which the engine is still cold and the air-fuel ratio is $\lambda<1$, the engine control system divides a given amount of fuel into two parts, desirably two approximately equal parts, and energizes the fuel injector to intermittently deliver the parts of fuel through early and late split injection respectively in a intake stroke and controls the fuel injector to such that the midpoint between points at which said early and late split injection are timed respectively to start is before the midpoint of a intake stroke.

According to another embodiment of the invention, the engine control system is operative to control a direct injection-spark ignition type of engine which is equipped with a fuel injector for delivering fuel directly into a combustion chamber and an exhaust system having a lean NOx conversion catalyst for lowering an emission level of nitrogen oxides (NOx) in exhaust gas at an air-fuel ratio of $\lambda>1$ such that the engine makes stratified charge combustion in a lower engine loading zone and homogeneous charge combustion in a zone other than the lower engine loading zone. while the engine is monitored to be in an operating condition in which the engine is still cold and the air-fuel ratio is $\lambda<1$, the engine control system divides a given amount of fuel into two parts, desirably two approximately equal parts, and energizes the fuel injector to intermittently deliver the parts of fuel through early and late split injection respectively in a intake stroke and controls the fuel injector to such that the midpoint between points at which said early and late split injection are timed respectively to start is before the midpoint of a intake stroke.

While a part of fuel delivered through the early split injection is sufficiently diffused homogeneously in the combustion chamber whose volume increases as the piston moves down before the late split injection is started, another part of fuel subsequently delivered through the late split injection is diffused and made homogeneous in the combustion chamber whose volume has sufficiently increased. In consequence, a homogeneous fuel mixture is provided in the combustion chamber with an effect of increasing both combustion velocity and combustion stability without enhancing penetration force of a spray of fuel.

The control in which fuel injection is made such that the midpoint between points at which the early and late split injection are timed respectively to start is before the midpoint of a intake stroke provides various prominent effects described below. On condition that a given amount of fuel has to be injected within an entire intake stroke, the early split injection can be timed to be caused at a point at which the piston moves down at a relatively high speed, which is accompanied by generation of a strong intake air stream, accelerating accomplishment of a homogeneous distribution of fuel mixture and evaporation of fuel. The early and late split injection is off as one whole to the early side of a intake stroke and, in consequence, fuel delivered through the late split injection sticks to a cylinder wall near when the piston reaches its bottom-dead-center (at the end of a intake stroke), so as to evade tardy accomplishment of a homogeneous distribution of fuel mixture. In addition, there is certainly provided a long period of time allowed for a fuel mixture to evaporate before spark ignition of the fuel mixture and a rise in intake air temperature by recirculated exhaust gas, which are always desirable for acceleration of fuel evaporation. These effects mutually affect one another to produce a greatly improved homogeneous distribution of fuel and significantly improving combustion efficiency of fuel mixture due to a shortened combustion time, lowering the temperature of exhaust gas.

When dividing a given amount of fuel into two approximately equal parts for the early and late split injection, a sufficiently long time is provided for each split injection, so as to prevent atomization of fuel from being blocked by opening and shutting movement of intake and exhaust valves.

The late split injection may be timed to start at a point in one of first and middle divisions of three approximately equal divisions of a intake stroke of the cylinder piston and to end at a point in one of the first and middle divisions of a intake stroke while the engine operating condition is a lower engine speed zone. Since a time necessary for an engine output shaft to make one revolution is significantly short in a zone excepting the lower engine speed zone, it is practically impossible to bring the late split injection to an end in one of the first and middle divisions of a intake stroke.

The late split injection may be timed to put its midpoint before the midpoint of a intake stroke of the cylinder piston at which the cylinder piston attains a maximum down speed. In this instance, the late split injection is made when the cylinder piston attains a maximum down speed and, in consequence, causes an intake air stream to flow with the greatest velocity, providing a homogeneous distribution of fuel in the combustion chamber.

Although, in order to improve startability of an engine, it is popular in the prior art to increase the amount of fuel at cranking and deliver it in a plurality of parts, the engine control system of the invention may cause the split fuel injection to start after an engine start while the engine is in a cold condition.

The engine control system desirably incorporates an exhaust gas recirculation system and causes the exhaust gas recirculation system to admit exhaust gas into an intake air stream while the engine is in an operating condition in which an engine cooling temperature is higher than a specified level and an air-fuel ratio is in the enriched zone. In this instance, while the engine is warming up to a temperature higher than the specified value even in a cold condition, the recirculation of exhaust gas into the combustion chamber in combination with improved combustion stability due to the split injection lowers a pumping loss with an effect of lowering specific fuel consumption and provides a drop in the maximum temperature of exhaust gas with an effect of lowering the emission level of NOx as well as accelerating evaporation of a spray of fuel.

The engine control system may incorporate an air stream control means for creating an air stream in the combustion chamber to accelerate accomplishment of a homogeneous distribution of fuel with an effect of improving combustion stability. Further, the fuel injector is desirable to be of a type having a spray angle of greater than 45° for acceleration of easy accomplishment of a homogeneous distribution of fuel.

BRIEF DESCRIPTION OF THE DRAWINGS

The foregoing and other objects and features of the present invention will be clearly understood from the following detailed description of preferred embodiments when read in conjunction with the accompanying drawings in which:

FIGS. 5(A) through 5(D) are a flow chart illustrating a sequence routine of fuel injection control for a microcomputer of an engine control unit;

FIG. 6 is a time chart of fuel injection for various engine operating zones;

FIG. 8 is another time chart of fuel injection for various engine operating zones;

DETAILED DESCRIPTION OF THE PREFERRED EMBODIMENT

The term "NOx conversion" as used throughout the specification shall mean and refer to a reduction in the NOx content of exhaust gas due such as to NOx adsorption on a NOx adsorption type of catalyst and reduction of NOx to $N_2$ and $O_2$ by a NOx reduction type of catalyst, and the term "lean NOx conversion catalyst" as used throughout the specification shall mean and refer to the type controlling or lowering an emission level of nitrogen oxides (NOx) in a lean exhaust gas whose air-fuel ratio is $\lambda > 1$.

Because a direct injection-spark ignition type of gasoline engine is well known, the present description will be directed in particular to elements forming part of, or cooperating directly with, an engine control system in accordance with the present invention. It is to be understood that elements not specifically shown or described can take various forms well known to those skilled in the automobile art.

Figure 1:
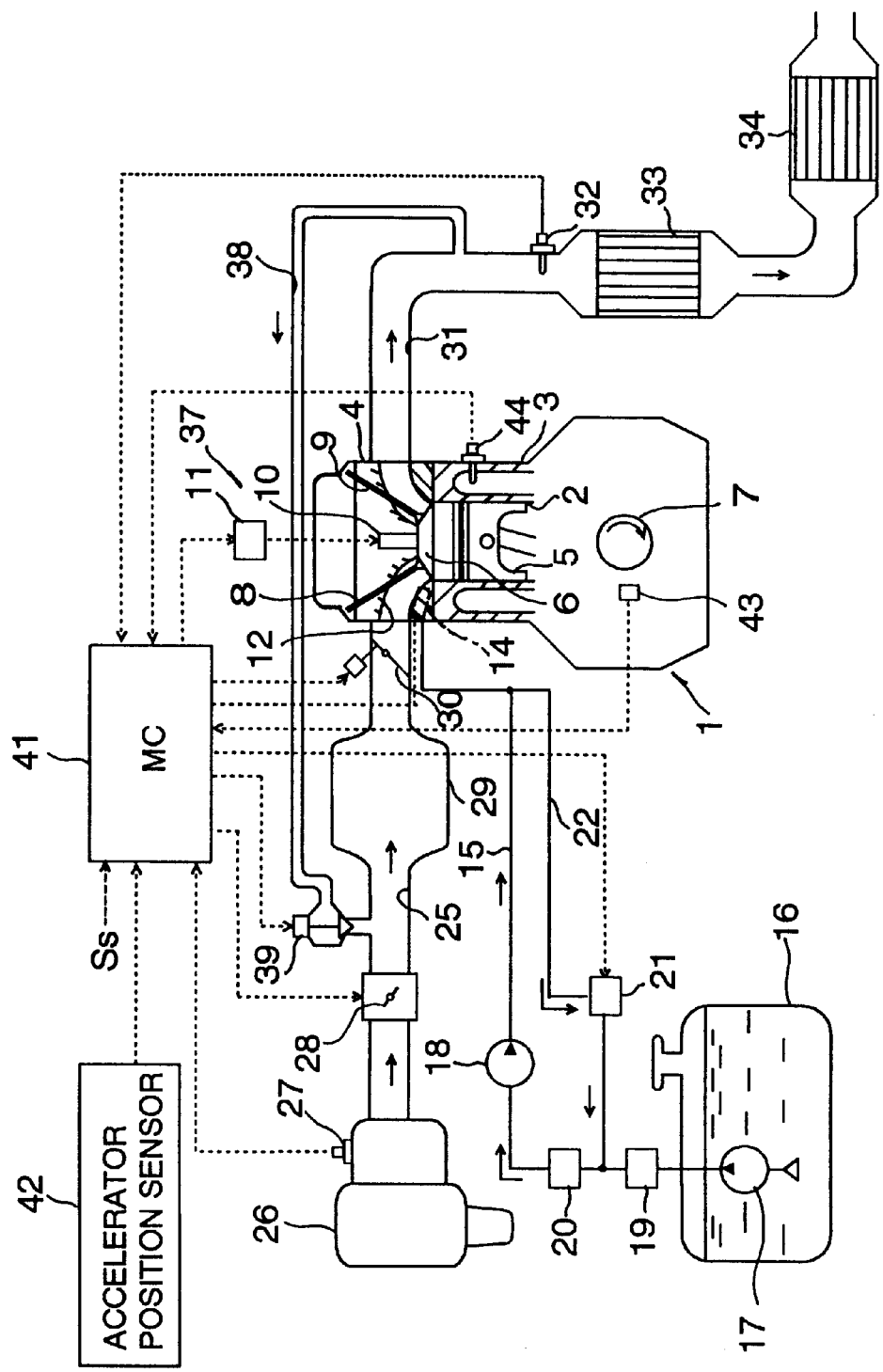
FIG. 1 is a schematic illustration of an engine control system in accordance with an embodiment of the invention.

Referring to the drawings in detail and, in particular, to FIG. 1 showing an engine control system in accordance with an embodiment of the invention, a fuel direct injection type of multiple cylinder engine 1 equipped with exhaust gas recirculation system, which is controlled by the engine control system, is comprised of a cylinder block 3 provided with cylinder bores 2 (only one of which is shown) in which pistons 5 can slide and a cylinder head 4 mounted on the cylinder block 3. A combustion chamber 6 is formed in the cylinder by the top of the piston 5, a lower wall of the cylinder head 4 and the cylinder bore 2. Two intake ports 12 (only one of which is shown) and one exhaust port 13 are opened into the combustion chamber 6, and are opened and shut at a predetermined timing by intake valves 8 and an exhaust valve 9, respectively. A fuel injector 14 is installed into the cylinder head 4 such that a spray of fuel is directly charged into the combustion chamber 6 from the side. The piston 5 at its top cavity (not shown) traps the spray of fuel to form a stratum of relatively dense air-fuel mixture near the spark plug 10, so as thereby to form a stratified charge of air-fuel mixture in the combustion chamber 6. This engine 1 is of a direct injection-spark ignition type. A spark plug 10 is installed in the cylinder head 4 such that electrodes of the spark plug 10 are placed down into the combustion chamber 6 and aligned with the vertical center line of the cylinder and connected to an ignition circuit 11 to ignite an air-fuel mixture in the combustion engine. A fuel line 15, through which the fuel is delivered to the fuel injector 14 from a fuel tank 16 is equipped with two fuel pumps, namely a low pressure fuel pump 17 disposed in the fuel tank 16 and a high pressure fuel pump 18 disposed the outside of the fuel tank 16. The fuel line 15 between the fuel pumps 17 and 18 is further equipped with a low pressure regulator 19 and a fuel filter 20 positioned in this order from the side of fuel tank 16. A fuel return line 22 equipped with a high pressure regulator 21 is connected to the fuel line 15 between a point after the high pressure fuel pump 18 and a point before the fuel filter 20. Fuel is drawn up from the fuel tank 16 by the low pressure pump 17, regulated in pressure by the low pressure regulator 19, and then multiplied in pressurized by the high pressure fuel pump 18 to the fuel injector 14. The high pressurized fuel is partly delivered to the fuel injector 14 and partly returned through the return fuel line 22. The high pressure regulator 21 regulates a return fuel quantity so as to optimize the pressurized fuel in pressure level directed to the fuel injector 14.

An intake line 25 has an air cleaner 26 at the upstream end and an intake manifold at the downstream end which is independently connected to the intake ports 12 of the cylinder. An intake valve 8 is provided in each intake port 12 and an air stream control valve 30 is provided either one of the intake ports 12 only. The air stream control valve 30, which may be of an actuator operated type, causes an air stream to be admitted into the combustion chamber 6 through only the other intake port 12 while it closes, which results in forming, for example, a swirl of intake air abundant in tumble components in a direction of the vertical axis of the cylinder. The intake line 25 is provided with a heat sensing type of air-flow sensor 27, an electrically controlled throttle valve 28 and a surge tank 29 in order from the upstream end. The throttle valve 28 is not controlled directly by an accelerator pedal but indirectly by an accelerator pedal through an actuator (not shown).

An exhaust line 31 through which exhaust gas are discharged into the atmosphere is provided with an oxygen sensor (which is hereafter referred to as an $O_2$ sensor) 32, a three-way catalyst 33 and a NOx adsorption type of lean NOx conversion catalyst 34 (which may otherwise be of a NOx reduction type) in order from the upstream end. The $O_2$ sensor 32 monitors the oxygen concentration of exhaust gas based on which an air-fuel ratio is determined and provides an output sharply changing on opposite sides of a stoichiometric air-fuel ratio. Each of the catalysts 33 and 34 is of a type using a cordierite honeycomb block coated with a catalytic material which allows exhaust gas to flow through. The three-way catalyst 33 lowers emission levels of nitrogen oxides (NOx), hydrocarbons (HC) and carbon monoxide (CO) when a fuel mixture is enriched to be $\lambda<1$. The lean NOx conversion catalyst 34 adsorbs NOx and lowers an emission level of NOx in exhaust gas even when a fuel mixture is leaner than a stoichiometric fuel mixture as well as lowering emission levels of HC and CO. These three-way catalyst 33 and lean NOx conversion catalyst 34 may be replaced in position with each other. Further, when the lean NOx conversion catalyst 34 is of a double layer type that has a NOx adsorption catalytic layer and a NOx reduction catalytic layer, it is not always necessary to use the three-way catalytic converter.

An exhaust gas recirculation (EGR) system 37 is provided to admit exhaust gas partly into the intake line 25. The exhaust gas recirculation (EGR) system 37 has a recirculation line extending from the exhaust line 31 upstream the $O_2$ sensor 32 to the intake line 25 between the throttle valve 28 and the surge tank 29, and an electrically operated exhaust gas recirculation (EGR) valve 39 installed to the recirculation line 38 in a position close to the intake line 25. The amount of exhaust gas that is recirculated through the recirculation line 38 can be controlled by the EGR valve 39. This EGR valve 39 is designed to admit carefully controlled amounts of exhaust gas into the intake air stream.

Operation of the ignition circuit 11, the fuel injector 14, the high pressure regulator 21, the actuator of the throttle valve 28, the air stream control valve 30, the EGR valve and other electrically operated elements are controlled by a control unit 41 comprising a microcomputer MC. Various signals are transferred to the control unit 41 from at least the air-flow sensor 27, the $O_2$ sensor 32, an accelerator position sensor 42 which detects accelerator positions as engine loading, a crank angle sensor 43 which monitors angles of rotation of a crankshaft 7 of the engine as an engine speed of rotation, a temperature sensor 44 which monitors the temperature of engine cooling water to determine whether the engine 1 is in a cold condition, under a warming up, or in a warm condition, a position sensor (not shown) incorporated in the EGR valve 39 which monitors a valve lift of the EGR valve 39, and an engine starter (not shown). The fuel injector 14 is pulsed to open by energizing a solenoid according to a pulse width. The control unit 41 constantly monitors engine speed, load, throttle position, exhaust, temperature, etc to control the pulse width according to a fuel injection control map.

Figure 2:
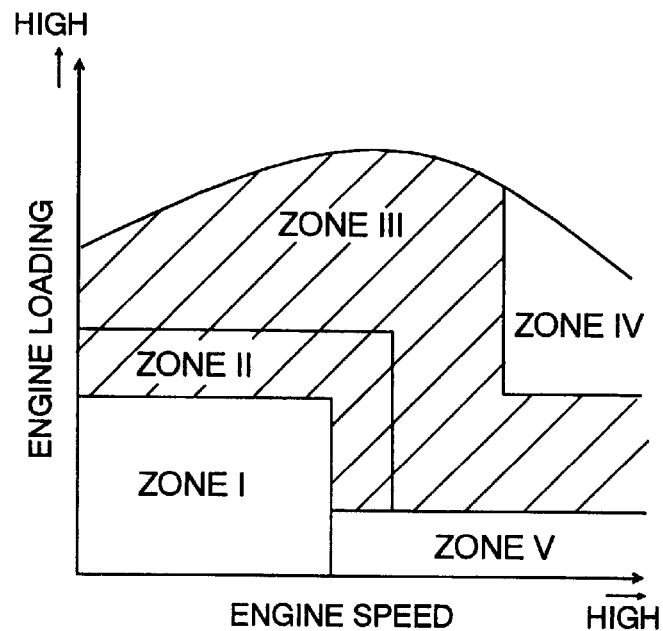
FIG. 2 is a diagram illustrating a map of fuel injection control zones for warm engine operation.
Figure 3:
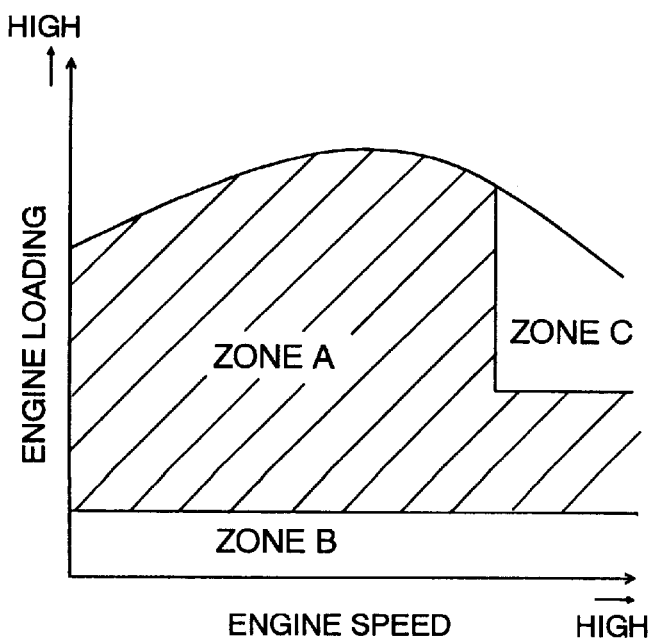
FIG. 3 is a diagram illustrating a map of fuel injection control zones for warm engine operation.

FIGS. 2 and 3 show fuel charge control maps with engine speed and loading as parameters for warm engine operations and cold engine operations, respectively, which define a lean fuel charge zone in which the engine is charged with an air-fuel mixture of $\lambda>1$ and an enriched fuel charge zone in which the engine is charged with an air-fuel mixture of $\lambda<1$ and, in another aspect, a non-split injection zone in which a given amount of fuel is delivered all at once and a split injection zone in which a given amount of fuel is delivered through in two steps or through two split injection. Specifically, the fuel charge control map shown in FIG. 2 used while the engine is in a warm condition (for example the temperature of engine cooling water is higher than 80° C.) defines five fuel charge control zones, namely a lean stratified charge zone (I), a lean homogeneous charge zone (II), and an enriched homogeneous charge zones (III)–(V). In the lean stratified charge zone (I) which is defined for lower engine loadings and lower to middle engine speeds, a given amount of fuel is sprayed all at once to cause lean stratified charge combustion immediately before an ignition timing at which the spark plug 10 is fired in a compression stroke. In the lean homogeneous charge zone (II) which is defined for lower to middle engine loadings and lower to middle engine speeds, a given amount of fuel is divided into two parts and sprayed in two steps in a intake stroke to cause lean homogeneous charge combustion. In the enriched homogeneous charge zone (III) which is defmed for higher engine loadings and higher engine speeds, a given amount of fuel is divided into two parts and sprayed in two steps in a intake stroke to cause enriched homogeneous charge combustion. In the enriched homogeneous charge zone (IV) which is defmed for higher engine loadings and higher engine speeds, a given amount of fuel is sprayed all at once in a intake stroke to cause enriched homogeneous charge combustion. In the enriched homogeneous charge zone (V) which is defined for lower engine loadings and middle to higher engine speeds, a given amount of fuel is sprayed all at once in a intake stroke to cause enriched homogeneous charge combustion. All these zones (I)–(V) are established so as not to overlap one another. The fuel charge control map shown in FIG. 3 used while the engine is in a cold condition (for example the temperature of engine cooling water is lower than 80° C.) defines three enriched homogeneous charge zones (A), (B) and (C). In the enriched homogeneous charge zone (A) which is defined for middle to higher engine loadings and lower to higher engine speeds, a given amount of fuel is divided into two parts and sprayed in two steps in a intake stroke to cause enriched homogeneous charge combustion. In both enriched homogeneous charge zone (B) which is defined for lower engine loadings and lower to higher engine speeds and enriched homogeneous charge zone (C) which is defmed for higher engine loadings and higher engine speeds, a given amount of fuel is sprayed all at once in a intake stroke to cause enriched homogeneous charge combustion. These three zones (A)–(C) are established so as not to overlap one another. While the engine operates in any one of the engine control zones (II), (III) and (A) shaded in FIGS. 2 and 3 in which split injection is made in a intake stroke, the EGR system 37 is actuated to admit amounts of exhaust gas controlled by the EGR valve 39 into the intake air stream. The exhaust gas recirculation (EGR) rate, which refers to a rate of the amount of exhaust gas that is recirculated relative to the amount of exhaust gas that is produced resulting from combustion varies according to engine operating conditions up to 10 to 40%. While the engine 1 in a cold condition is in the engine control zone (A), the exhaust gas recirculation is made only when the engine cooling water is warming up to a temperature higher than, for example, 45° C.

Figure 4:
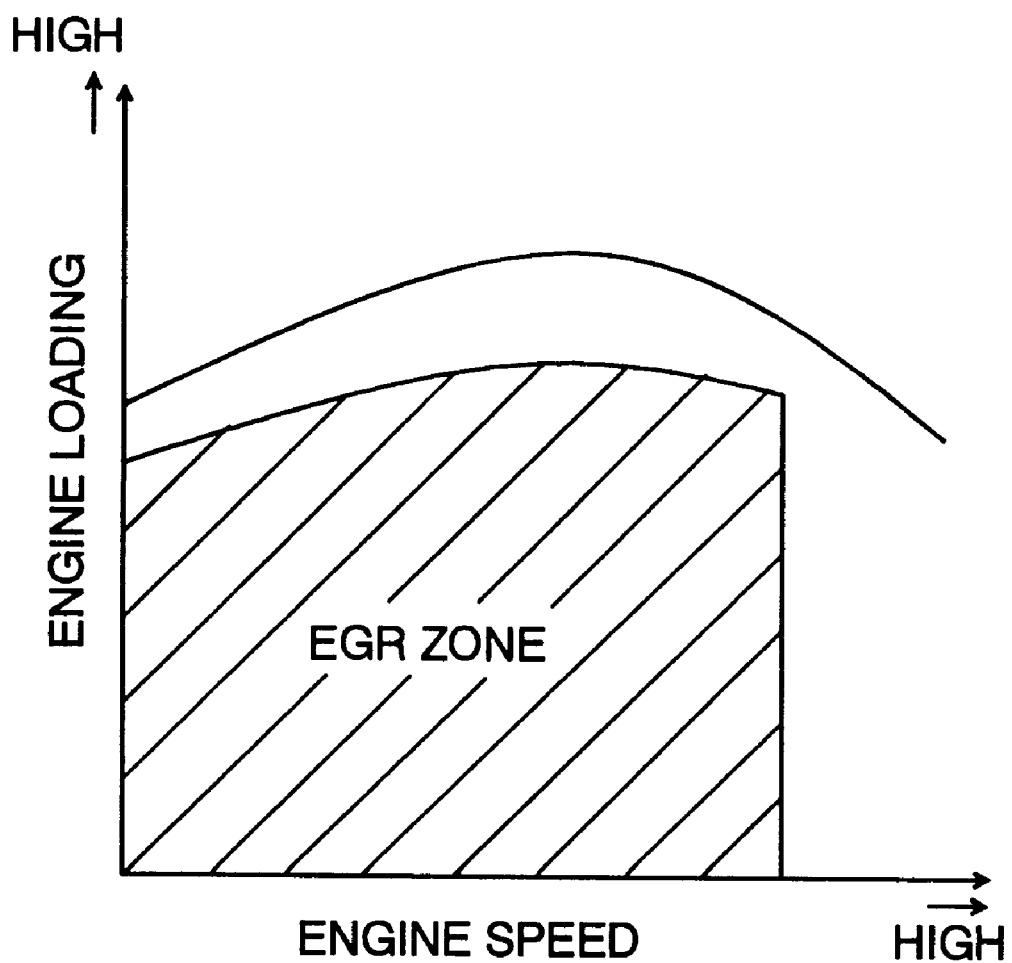
FIG. 4 is a diagram illustrating a map of exhaust gas recirculation control zone.
Figure 5A:
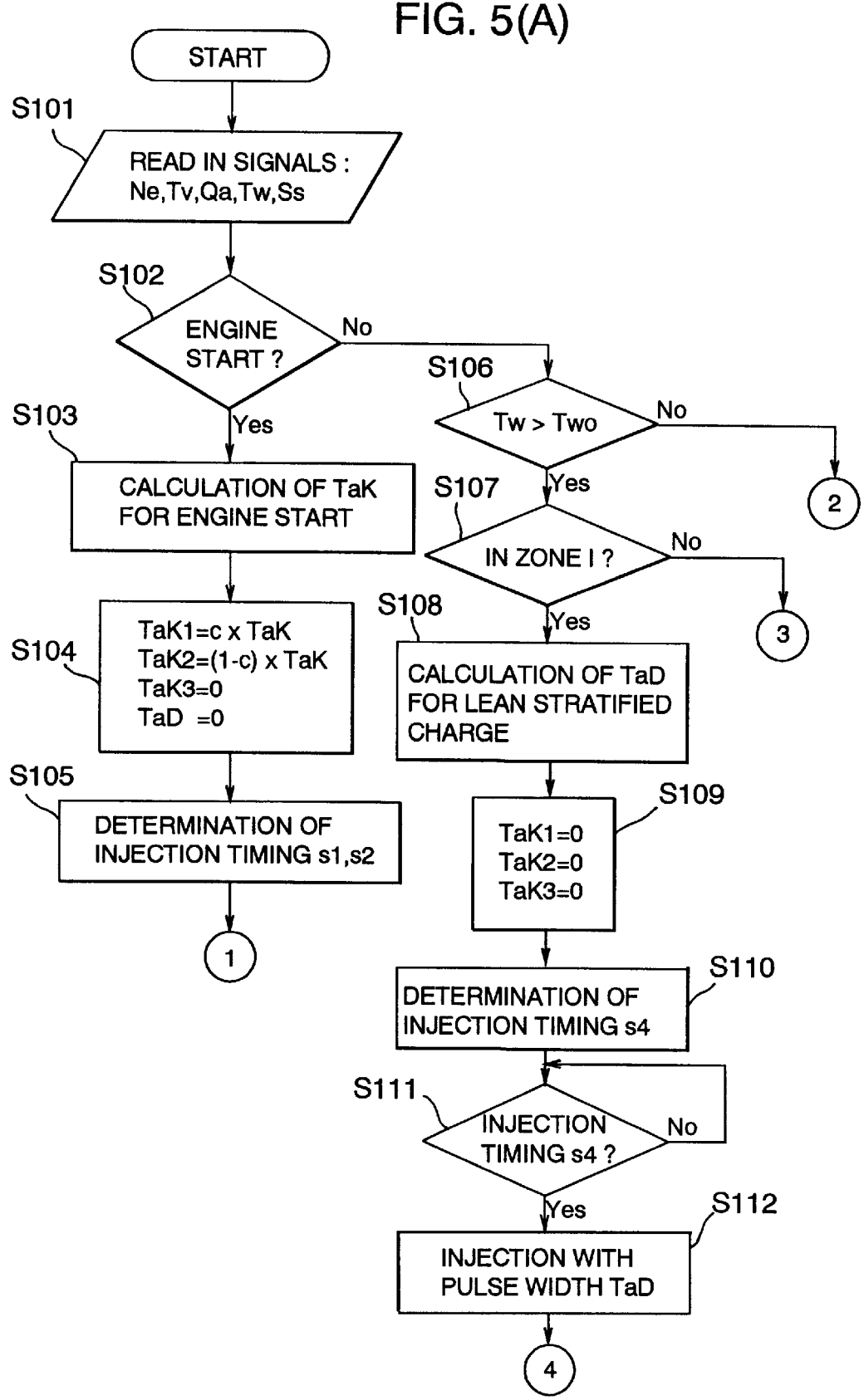
Figure 5B:
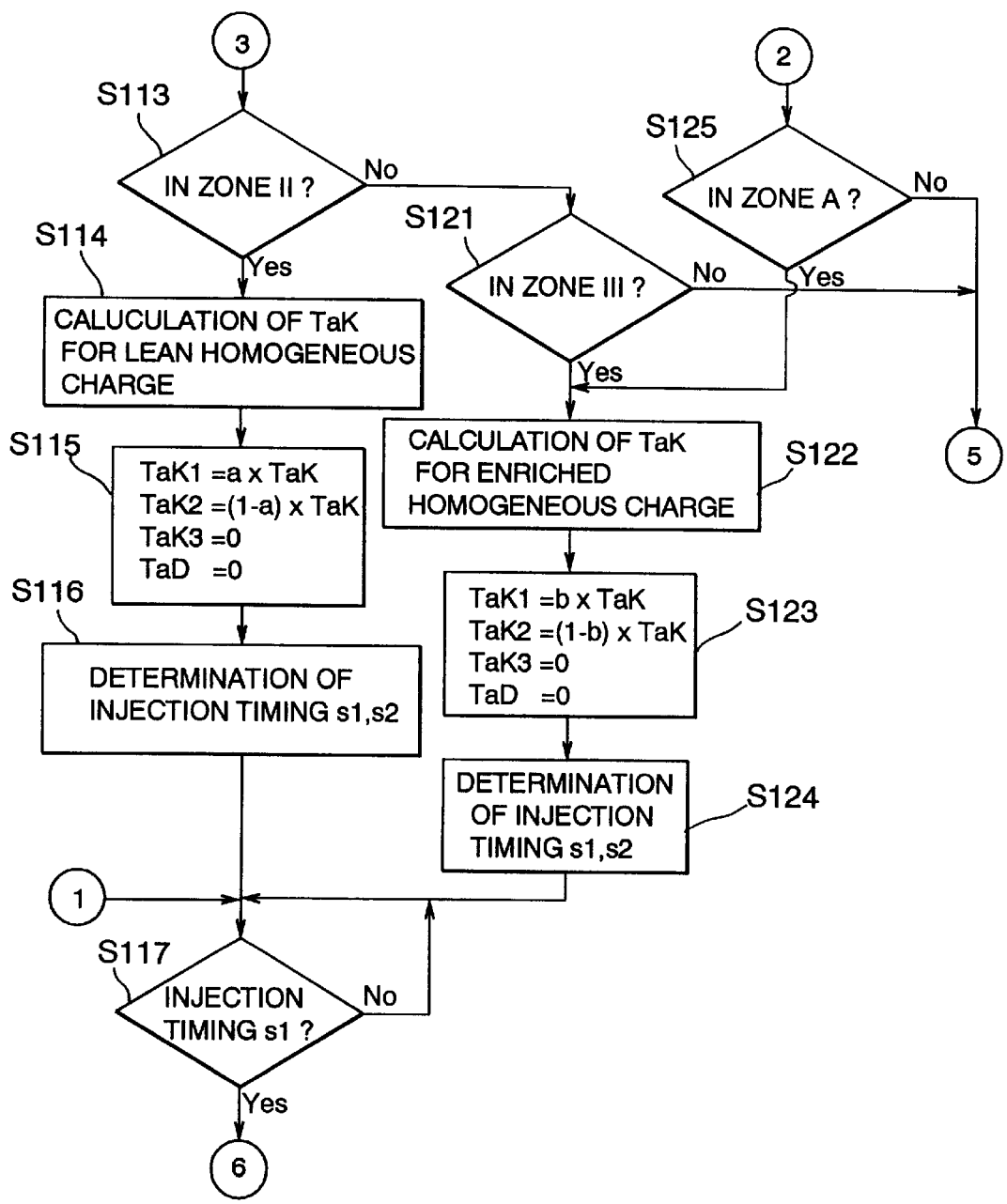

As shown in FIG. 4, the EGR zone covers the lean stratified charge zone (I), the lean homogeneous charge zone (II) and the enriched homogeneous charge zone (III) excepting a higher engine loading region for warm conditions, and the enriched homogeneous charge zone (A) excepting a higher engine loading region for cold conditions.

FIGS. 5(A) through 5(D) show a flow chart illustrating a sequence routine of fuel charge control.

As shown, when the flow chart logic commences and control proceeds directly to a function block at step S101 where signals Ne, Tv, Qa, Tw and Ss representative of various control factors such as engine speed, accelerator position, intake air quantity, cooling water temperature and a starter signal, respectively, are read into the control unit 41. Subsequently, a decision is made at step S102 as to whether the engine 1 starts. When there is an occurrence of a starter signal Ss and the engine speed Ne is lower than a specified speed, an engine start is ascertained. When the answer is affirmative, an injection pulse width TaK at the engine start is calculated at step S103. The given amount of fuel is divided into two parts for early fuel injection and later fuel injection made in an intake stroke according to a split ratio represented by a split factor c (1>0). For this purpose, the injection pulse width TaK is divided into two split injection pulse widths TaK1 which is expressed by c×TaK and TaK2 which is expressed by (1−c)×TaK at step S104. At the beginning of engine operation, a given amount of fuel is neither sprayed in non-split intake stroke injection nor in non-split compression stroke injection, and simultaneously both non-split intake stroke injection pulse width TaK3 and non-spilt compression stroke injection pulse width TaD are set to 0 (zero). Thereafter, split injection timings s1 and s2 for the early and later fuel injection are determined, respectively, at step S105. As shown by (b) in FIG. 6, the early and late split injection timings s1 and s2 are predetermined. That is, the early split injection timing s1 for the early fuel injection is dictated by an angle of rotation of the crankshaft 7 in an early half of a intake stroke and, more specifically, at a crank angle 45 to 50 degrees before top-dead-center in a intake stroke, and the late split injection is timed to start at a point or timing s2 in a later half of the intake stroke and, more specifically, at a crank angle 100 to 120 degrees after top-dead-center in the intake stroke. After the determination of early and late split injection timings s1 and s2 at step S105, a decision is made at step S117 as to whether it is the early split injection timing s1 for the early fuel injection. After waiting up to the early split injection timing s1 at step S117, the fuel injector 14 is pulsed to open to deliver the amount of fuel depending upon the early split injection pulse width TaK1 at step S118. Similarly, a decision is subsequently made at step S119 as to whether it is the late split injection timing s2 for the later fuel injection. After waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

On the other hand, when the answer to the decision as to engine start made at step S102 is negative, another decision is made at step S106 as to whether the cooling water temperature Tw is higher than a specified value Two, i.e. whether the engine 1 is in a warm condition. When the answer is affirmative, then, still another decision is made at step S107 as to whether the engine operating condition is in the lean stratified charge zone (I) for lower engine loadings and middle to higher engine speeds of the fuel charge control map for warm engine operation shown in FIG. 2. When the engine operating condition, or the engine loading and speed, is in the lean stratified charge zone (I), a non-split compression stroke injection pulse width TaD for the lean stratified charge combustion is calculated at step S108. In the lean stratified charge zone (I), neither split injection nor non-split intake stroke fuel injection is made, both split injection pulse widths Tak1 and Tak2 and non-split intake stroke injection pulse width TaK3 are set to 0 (zero) at step S109. Thereafter, a non-split compression stroke injection timing s3 is determined at step S110. As shown by (a) in FIG. 6, the non-split compression stroke injection timing s3 is predetermined. That is, the non-split compression stroke injection timing s3 is set in a later half of a compression stroke. Subsequently, a decision is made at step S111 as to whether it is the injection timing s3 for the non-split compression stroke injection. After waiting up to the non-split compression stroke injection timing s3 at step S111, the fuel injector 14 is pulsed to open to deliver the amount of fuel depending upon the non-split compression stroke injection width TaD at step S112. After a conclusion of the non-split compression stroke injection, the flow chart logic returns to restart the sequence routine.

When the answer to the decision as to engine operating condition made at step S107 is negative, another decision is subsequently made at step S113 as to whether the engine operating condition is in the lean homogeneous charge zone (II) for lower engine loadings and lower to middle engine speeds of the fuel charge control map for warm engine operation shown in FIG. 2. When the engine operating condition, or the engine loading and speed, is in the lean homogeneous charge zone (II), an injection pulse width TaK for lean homogeneous charge combustion is calculated at step S114. The given amount of fuel is divided into two parts for early fuel injection and later fuel injection made in a intake stroke according to a split ratio represented by a split factor a (1>0) at step S115. The injection pulse width TaK is divided into an early split injection pulse width TaK1 which is expressed by a×TaK and a late split injection pulse width Tak2 which is expressed by (1−a)×TaK. In the lean homogeneous charge zone (II) the given amount of fuel is neither sprayed in non-split intake stroke injection nor in non-split compression stroke injection and consequently both non-split intake stroke injection pulse width TaK3 and non-spilt compression stroke injection pulse width TaD are set to 0 (zero). Thereafter, early and late split injection timings s1 and s2 are determined as shown by (b) in FIG. 6 at step S116, After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the engine operating condition is out of the lean homogeneous charge zone (II), another decision is subsequently made at step S121 as to whether the engine operating condition is in the enriched homogeneous charge zone (III) for middle to higher engine loadings and lower to higher engine speeds of the fuel charge control map for warm engine operation shown in FIG. 2. When the engine operating condition, or the engine loading and speed, is in the enriched homogeneous charge zone (III), an injection pulse width TaK for enriched homogeneous charge combustion is calculated at step S122. The given amount of fuel is divided into two early fuel injection and later fuel injection made in a intake stroke according to a split ratio represented by a split factor b (1>0) at step S123. The injection pulse width TaK is divided into an early split injection pulse width TaK1 which is expressed by b×TaK and a late split injection pulse width TaK2 which is expressed by (1−b)×TaK. In the enriched homogeneous charge zone (III) the given amount of fuel is sprayed neither in non-split intake stroke injection nor in non-split compression stroke injection and conse-quently both non-split intake stroke injection pulse width TaK3 and non-spilt compression stroke injection pulse width TaD are set to 0 (zero). In the same manner as in the lean homogeneous charge zone (II), early and late split injection timings s1 and s2 are determined as shown by (b) in FIG. 6 at step S124. After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the answer to the decision as to the enriched homogeneous charge combustion is negative, this indicates that the engine operating condition is in either the enriched homogeneous charge zone (IV) for higher engine loadings and higher engine speeds or the enriched homogeneous charge zone (V) for lower engine loadings and middle to higher engine speeds, then, an injection pulse width TaK for enriched homogeneous charge combustion is calculated at step S126. In the zone (IV) or (V), the given amount of fuel is sprayed all at once in a intake stroke, the injection pulse width TaK is employed as a non-split intake stroke injection pulse width TaK3 at step S127. Simultaneously, both split injection pulse widths Tak1 and Tak2 and non-split com-pression stroke injection pulse width TaD are set to 0 (zero). Thereafter, a non-split intake stroke injection timing s4 is determined at step S128. As shown by (c) in FIG. 6, the non-split intake stroke injection timing s4 is predetermined. That is, the non-split intake stroke injection timing s4 is set such that the non-split intake stroke injection is started at approximately the midpoint of a intake stroke. Subsequently, after waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

Further, when the answer to the decision as to cooling water temperature Tw made at step S106 is negative, this indicates that the temperature of cooling water Tw is lower than specified value Two, for example 80° C. and, in consequence, the engine 1 is still in a cold condition, then, another decision is subsequently made at step S125 as to whether the engine operating condition is in the enriched homogeneous charge zone (A) for middle to middle to higher engine loadings of the fuel charge control map for cold engine operation shown in FIG. 3. When the engine operating condition, or the engine loading and speed, is in the enriched homogeneous charge zone (A), steps S122–S124 and S117 through S120 are taken to cause early and late split injection in a intake stroke to deliver the given amounts of fuel depending upon the early and late split injection pulse widths TaK1 and TaK2.

On the other hand, when the answer to the decision as to engine operating condition made at step S125 is negative, this indicates that the engine operating condition is either the enriched homogeneous charge zone (B) for lower engine loadings or the enriched homogeneous charge zone (C) for higher engine loadings and higher engine speeds, then, a given amount of fuel is sprayed in non-split intake stroke injection. An injection pulse width TaK for enriched homo-geneous charge combustion is calculated at step S126 and is employed as a non-split intake stroke injection pulse width TaK3 at step S127. Simultaneously, both split injection pulse widths Tak1 and Tak2 and non-split compression stroke injection pulse width TaD are set to 0 (zero). After waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

In the engine operation control system according to the above embodiment, the midpoint m between the early and late split injection timings s1 and s2 is put before the midpoint M of a intake stroke which is at a crank angle 90 degrees after top-dead-center. Each injection pulse split factor a, b, c is set approximately 0.5, which divides a given amount of fuel into two exact halves for early and later fuel injection.

In operation of the engine control system according to the above embodiment of the invention, immediately after an engine start, a given amount of fuel is divided into two parts and sprayed through early and late split injection in a intake stroke as shown by (b) in FIG. 6. During idling after the engine start, while the engine 1 is monitored to be still in a cold condition in which the cooling water temperature Tw is lower than the specified value Two in the enriched homogeneous charge zone (B) for lower engine loadings and in the enriched homogeneous charge zone (C) for higher engine loadings and higher engine speeds, a given amount of fuel is delivered all at once in a intake stroke as shown by (c) in FIG. 6. Further, during in a cold condition, when the engine 1 operates in the enriched homogeneous charge zone (A) for middle to higher engine loadings, a given amount of fuel is delivered in two steps through early and late split injection in a intake stroke as shown by (b) in FIG. 6.

After the cooling water temperature Tw reaches the specified value Two, or during in warm engine operation, a given amount of fuel is divided into two parts and sprayed through early and late split injection in a intake stroke as shown (b) in FIG. 6 when the engine 1 operates in the lean homogeneous charge zone (II) for lower to middle engine loadings and lower to middle engine speeds or in the enriched homogeneous charge zone (III) for middle to higher engine loadings. On the other hand, a given amount of fuel is sprayed all at once in a compression stoke as shown by (a) in FIG. 6 when the engine 1 operates in the lean stratified charge zone (I) for lower engine loadings and lower to middle engine speeds or in a intake stroke as shown by (b) in FIG. 6 when the engine 1 operates in the enriched homogeneous charge zone (IV) for higher engine loadings and higher engine speeds or in the enriched homogeneous charge zone (V) for lower engine loadings and middle to higher engine speeds. Further, while the engine operates in the zone in which a given amount of fuel is sprayed through early and late split injection in a intake stroke, i.e. in any one of the enriched homogeneous charge zone (A), the lean homogeneous charge zone (II) and the enriched homogeneous charge zone (III), the EGR valve 39 is actuated to admit exhaust gas in the exhaust line 31 partly into an intake air stream in the intake line 25. The exhaust gas recirculation is executed while the engine 1 is warming up to a temperature higher than the specified value. Practically, the exhaust gas recirculation (EGR) rate is significantly low while the engine operates with higher loadings in the enriched homogeneous charge zone (A) and the enriched homogeneous charge zone (III). The EGR valve 39 may be shut in the higher loading zone as shown in FIG. 4.

When a given amount of fuel is delivered in two steps through early and late split injection in a intake stroke while the engine 1 operates in the enriched homogeneous charge zone (A) under a cold condition in which the temperature of cooling water is lower than the specified value. The part of fuel sprayed through the early split injection is homogeneously diffused in the combustion chamber 6 with an increase in volume of the combustion chamber 6 following a down stroke of the piston 5 with absence of fuel injection before the late split injection. Subsequently, the part of fuel splayed through the late split injection is diffused, so as to provide a homogeneous distribution of air-fuel mixture in the combustion chamber 6. As a result, the combustion velocity is increased in a piston stroke following a compression stroke with an effect of improving combustion stability. Further, because the midpoint m between the early and late split injection timings s1 and s2 is set before the midpoint of a intake stroke M, even on condition that a given amount of fuel has to be completely delivered through two steps of injection before the end of a intake stroke, the early split injection is made correspondingly to a point of time at which the piston 5 attains a relatively high down speed with an effect of causing a strong intake air stream to enter with a high velocity. In consequence, accomplishment of a homogeneous distribution of fuel and evaporation of fuel is significantly accelerated. Further, the early and late split injection are shifted as one whole on an early side of a intake stroke, so as to prevent or significantly reduce sticking of sprayed fuel through the late split injection to the side wall of the cylinder bore 2 when the piston 5 reaches near bottom-dead-center or at the end of a intake stroke, which is always desirable for a homogeneous distribution of fuel in the combustion chamber 6. Furthermore, there is provided a long time before fuel ignition in which fuel is allowed to be sprayed and evaporate. The acceleration of accomplishment of a homogeneous distribution of fuel and evaporation of fuel are significantly enhanced by producing a swirl of intake air introduced into the combustion chamber 6 through only either one of the intake ports 12. These effects mutually act on one another to provide a great rise in combustion velocity and a significant reduction in combustion time, improving combustion stability as well as specific fuel consumption.

In order to empirically demonstrate the extent of the improvement of combustibility, measurements of combustion stability and changes in specific fuel consumption of an engine were made in such a manner that, while a given amount of fuel was divided into two approximately equal parts for early and late split injection, the early split injection was fixedly timed to start at a point or timing s1 an early stage of a intake stroke and the late split injection was timed to start at a point s2 changing in a period of time lying between a intake stroke and a subsequent compression stroke. The result of measurements is shown in FIGS. 7(A) and 7(B).

Figure 7A:
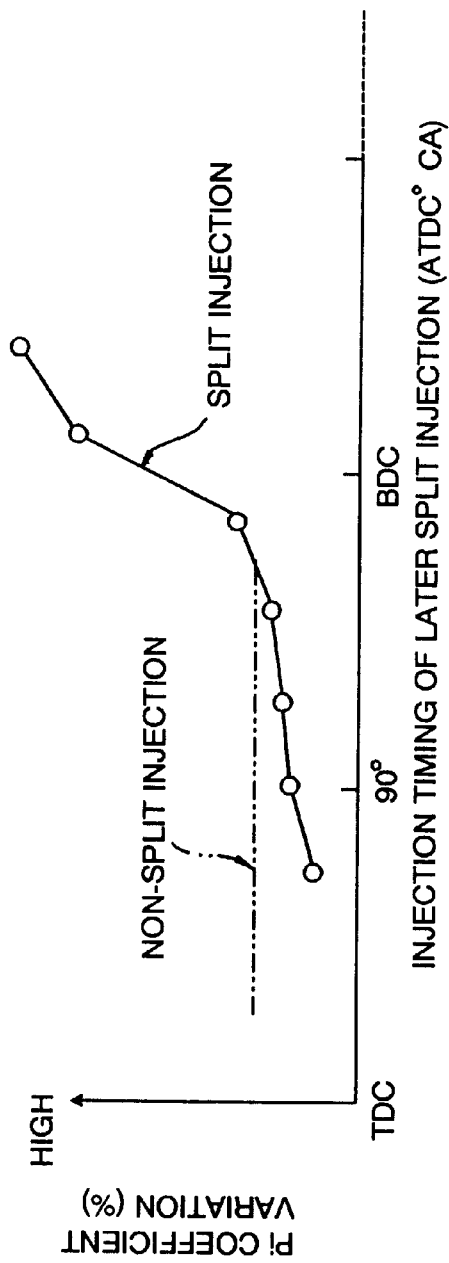
FIGS. 7(A) and 7(B) are graphical illustration of Pi coefficient variation and specific fuel consumption, respectively, relative to late split injection timing.
Figure 7B:
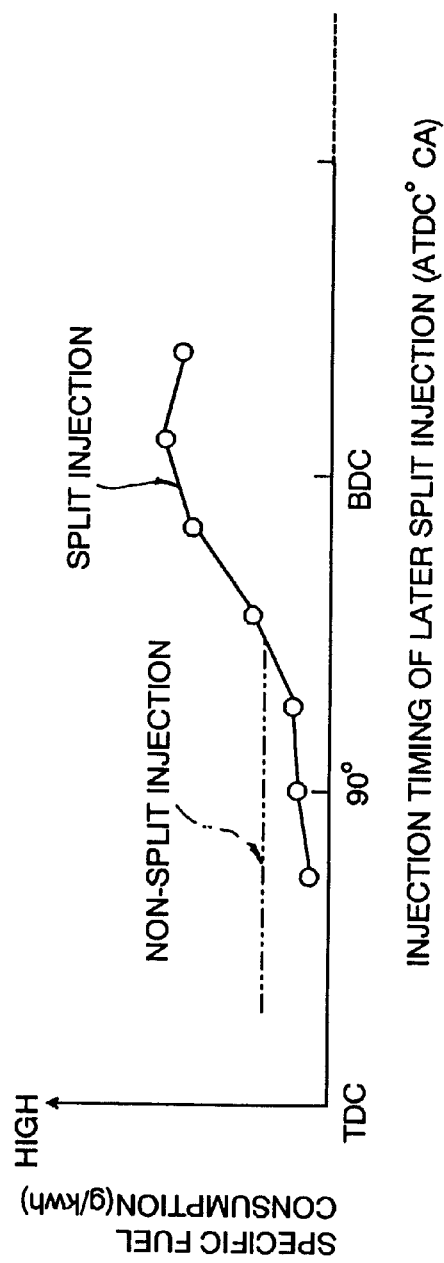

Referring to FIG. 7(A) showing the coefficient variation of indicated mean effective pressure (Pi coefficient variation), it is proved that, as the early split injection timing s1 is advanced, the Pi coefficient variation and the specific fuel consumption lower. In more detail, when the early split injection is timed to start at a point s1 before reaching a crank angle of 120° after top-dead center in an exhaust stroke, i.e. at a point in an early-to-middle division of a intake stroke, both Pi coefficient variation and specific fuel consumption are reduced more as compared to the case where a given amount of fuel is sprayed through non-split injection. The Pi coefficient variation and the specific fuel consumption are reduced greatly as the late split injection timing s2 is advanced. Accordingly, in a zone where the given amount of fuel, and hence a injection pulse width, is small such as a zone for low loading and low speed engine operating zones, the combustibility is even more improved greatly when the late split injection is advanced so as to end before an crank angle of 120° after top-dead center.

As shown in FIGS. 8, when the midpoint of a late split injection period is put at a point, for example at a crank angle of 86° after top-dead center, where the piston 5 attains the highest lowering speed before the midpoint M of a intake stroke, the late split injection is made in a condition where the piston 5 moves down with the highest speed with an effect of causing an intake air stream to enter with the highest speed, a spray of fuel through the late split injection is homogeneously distributed in the combustion chamber 6 by the intake air stream, which provides more enhanced improvement of the combustibility. In this instance, the timing of early split injection s1 is fixed at a crank angle of 20° after top-dead center, and the late split injection timing s2 is fixed at a crank angle of 70° after top-dead center.

According to the engine control system described above, while the engine 1 is in a cold condition and operates in the enriched homogeneous charge zone (A), the split injection is made even to provide a great improvement of combustion stability. In consequence, there is no necessity of greatly increasing the amount of fuel injection even while the engine 1 is still in a cold condition and the fuel mixture is vaporized without being overly enriched, enabling the engine 1 to lower both specific fuel consumption and the level of harmful emission. As the result of the great improvement of combustion stability, since, even while the engine 1 operates in a cold condition, the exhaust gas recirculation system 37 is actuated to admit exhaust gas into the combustion chamber 16 when the temperature of cooling water rises above the specified value, evaporation of sprayed fuel is accelerated due to the exhaust gas recirculation and specific fuel consumption is lowered due to a reduction in pumping loss. Furthermore, the maximum temperature of exhaust gas is lowered, so that the formation of NOx is significantly restrained.

Figure 9:
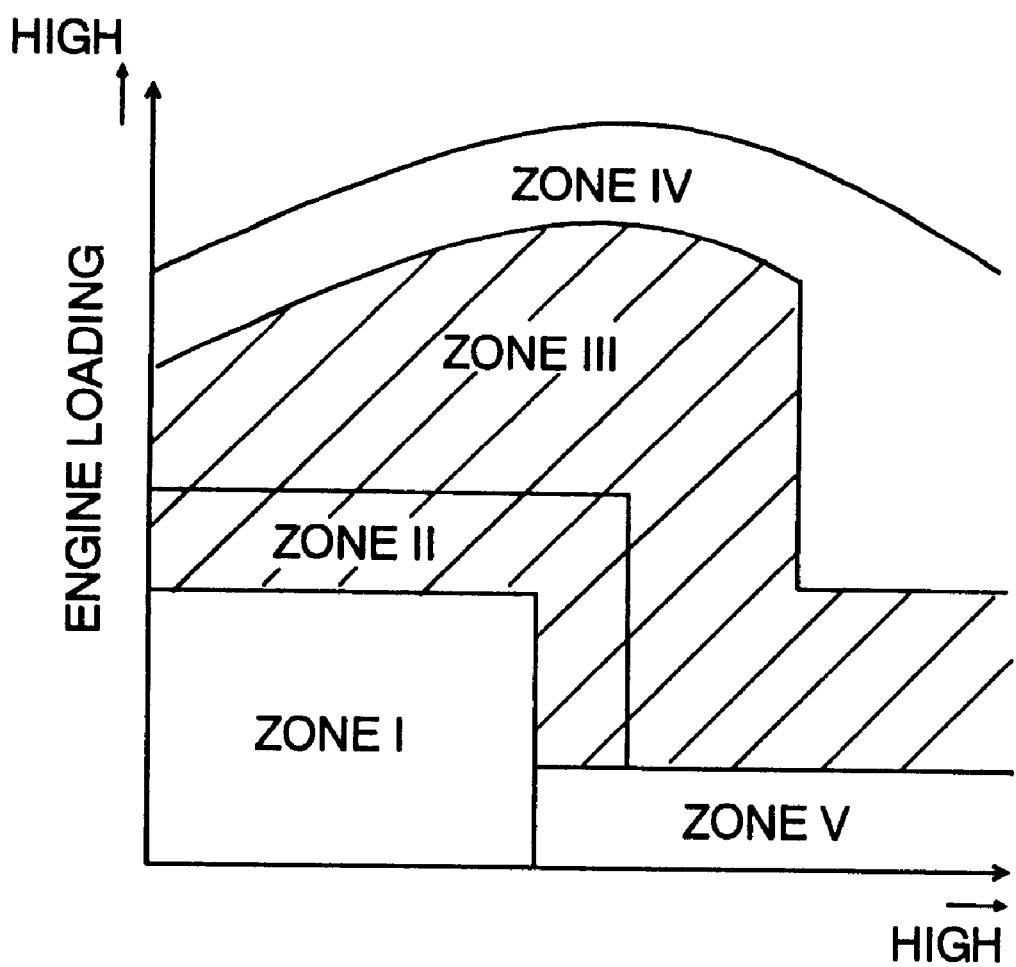
FIG. 9 is a diagram illustrating a variation of the map of fuel injection control zones for warm engine operation shown in FIG. 2.

FIG. 9 show a fuel charge control map for cold engine operation which is similar to that shown in FIG. 2 but has an enriched homogeneous charge zone (IV) is expanded above an enriched homogeneous charge zone (III). When using the fuel charge control map in the fuel charge control shown in FIGS. 5(A) through 5(D), the exhaust gas recirculation control is executed while the engine operates in the EGR zone shown in FIG. 4 which covers the lean stratified charge zone (I), the lean homogeneous charge zone (II) and the enriched homogeneous charge zone (III).

Figure 10:
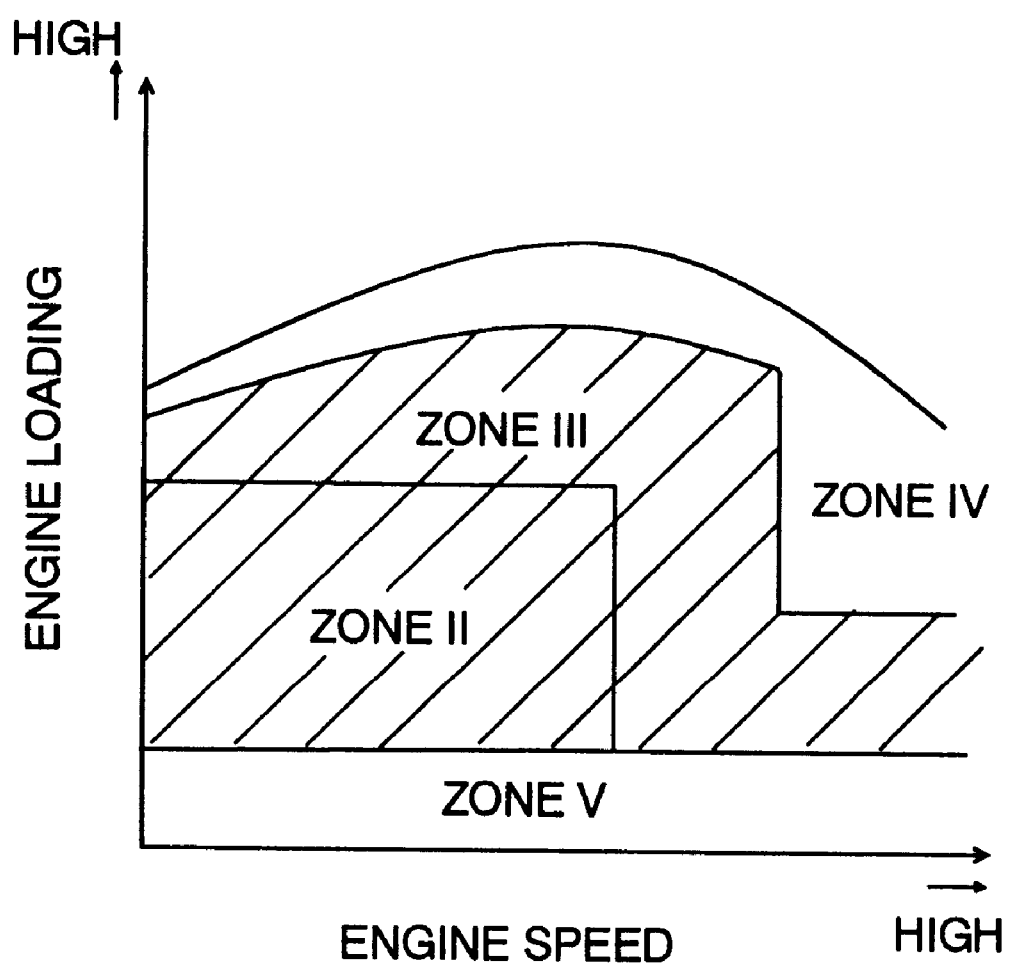
FIG. 10 is a diagram illustrating another variation of the map of fuel injection control zones for warm engine operation shown in FIG. 2.

FIG. 10 show a fuel charge control map for cold engine operation which is suitably used for fuel charge control of a direct injection-spark ignition engine of a type which does not have a stratified charge combustion feature. As shown in FIG. 10, the fuel charge control map is similar to that shown in FIG. 9 but, while having no lean stratified charge zone (I), defines an enriched homogeneous charge zone (V) lying over possible engine speeds in which non-split injection is made. This type of direct injection-spark ignition engine has no necessity of having a piston formed with a top cavity and provides a reduction in heat loss consequently.

The engine control system of the invention may be employed to control an engine not operative with a lean mixture, such as an engine which is operated with a stoichiometric mixture in a partial loading zone and with an enriched mixture in a full loading zone, and an engine which is operated with a stoichiometric mixture over a full range of loadings. In these cases, the split injection eliminates an increase in the amount of fuel while the engine is in a cold condition, enabling the engine 1 to lower both specific fuel consumption and the level of harmful emission. Further, it is not always necessary to use the lean NOx catalyst 34 as long as the three-way catalyst 33 is installed.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for a direct injection-spark ignition type of engine; which is equipped with a fuel injector for spraying fuel directly into a combustion chamber, said engine control system comprising:

engine operating condition monitoring means for monitoring engine operating conditions; and fuel injection control means for, while said engine operating condition monitoring means monitors an engine operating condition in an enriched zone in which an air-fuel ratio is $\lambda<1$, dividing a given amount of fuel into two parts which are intermittently delivered through early and later split injection, respectively, in an intake stroke of a cylinder piston and controlling said fuel injector such that a midpoint of said split fuel injection is started in a cold engine condition after an engine starts and a midpoint between points at which said early and later split injection are timed respectively to start is before a midpoint of an intake stroke of said cylinder piston.

2. The engine control system as defined in claim 1, wherein said late split injection is timed to start at a point in one of first and middle divisions of three approximately equal divisions of an intake stroke of said cylinder piston.

3. The engine control system as defined in claim 2, wherein said late split injection is timed to end at a point in one of first and middle divisions of three approximately equal divisions of an intake stroke of said cylinder piston while said engine operating condition monitoring means monitors engine operating conditions in a lower engine speed zone.

4. The engine control system as defined in claim 2, wherein a midpoint of said late split injection is timed to be at a point before said midpoint of an intake stroke of said cylinder piston at which said cylinder piston attains a maximum down speed.

5. The engine control system as defined in claim 3, wherein a midpoint of said late split injection is timed to be at a point before said midpoint of an intake stroke of said cylinder piston at which said cylinder piston attains a maximum down speed.

6. The engine control system as defined in claim 1, and further comprising an exhaust gas recirculation system, wherein said engine control system causes said exhaust gas recirculation system to admit exhaust gas into an intake air stream introduced into the engine while said engine operating condition monitoring means monitors an engine operating condition in which an engine cooling temperature is higher than a specified level and an air-fuel ratio is in said enriched zone.

7. The engine control system as defined in claim 1, and further comprising an air stream control means for creating an air stream in said combustion chamber.

8. The engine control system as defined in claim 1, wherein said fuel injector has a spray angle of greater than 45°.

9. The engine control system as defined in claim 1, wherein said fuel injection control means divides a given amount of fuel into two approximately equal parts for said early and late split injection.

10. An engine control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gases at an air-fuel ratio $\lambda > 1$ for controlling the engine to make stratified charge combustion in a zone of lower engine loading and homogeneous charge combustion in a zone other than said zone of lower engine loading, said engine control system comprising:

engine operating condition monitoring means for monitoring engine operating conditions; and fuel injection control means for, while said engine operating condition monitoring means monitors engine operating conditions in said zone other than said zone of lower engine loading, dividing a given amount of fuel into two parts which are intermittently delivered through early and later split injection, respectively, in a suction stroke of said cylinder piston and controlling said fuel injector such that a midpoint between points at which said early and later split injection are timed respectively to start is before a midpoint of intake stroke of said cylinder piston.

11. The engine control system as defined in claim 10, wherein said late split injection is timed to start at a point in one of first and middle divisions of three approximately equal divisions of an intake stroke of said cylinder piston.

12. The engine control system as defined in claim 10, wherein a midpoint of said split fuel injection is started in a cold engine condition after an engine start.

13. The engine control system as defined in claim 10, and further comprising an exhaust gas recirculation system, wherein said engine control system causes said exhaust gas recirculation system to admit exhaust gas into an intake air stream introduced into the engine while said engine operating condition monitoring means monitors an engine operating condition in which an engine cooling temperature is higher than a specified level and an air-fuel ratio is in said enriched zone.

14. The engine control system as defined in claim 10, and further comprising an air stream control means for creating an air stream in said combustion chamber.

15. The engine control system as defined in claim 10, wherein said fuel injector has a spray angle of greater than 45°.

16. The engine control system as defined in claim 10, wherein said fuel injection control means divides a given amount of fuel into two approximately equal parts for said early and late split injection.

* * * * *